Figure 1:
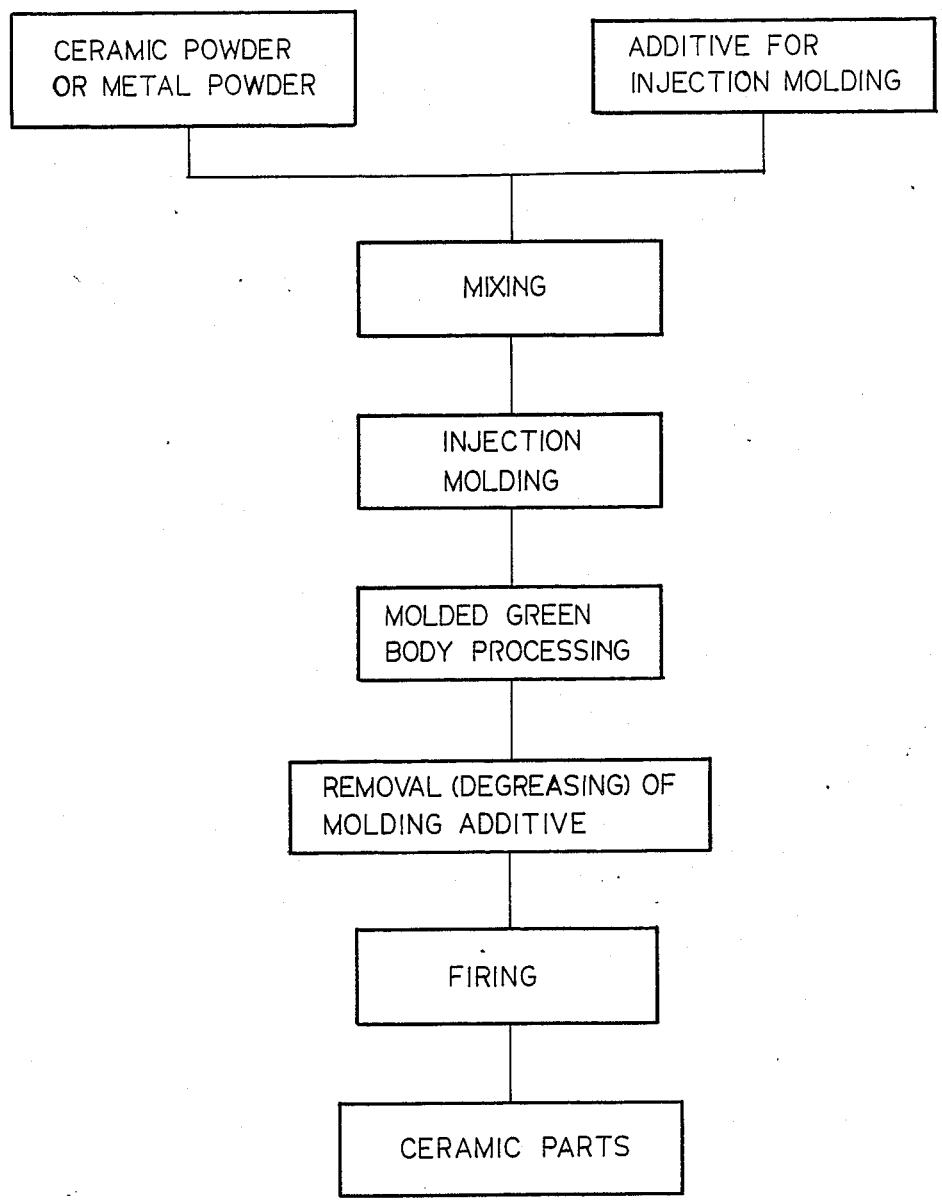
Figure 2A:
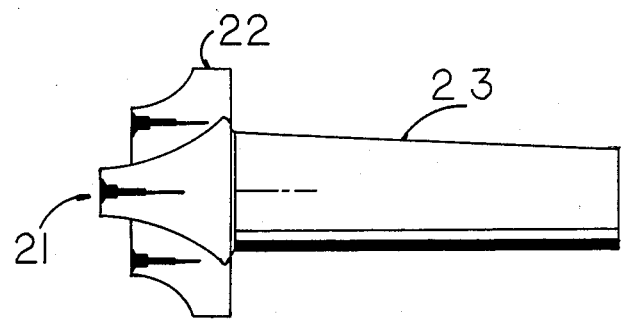
Figure 2B:
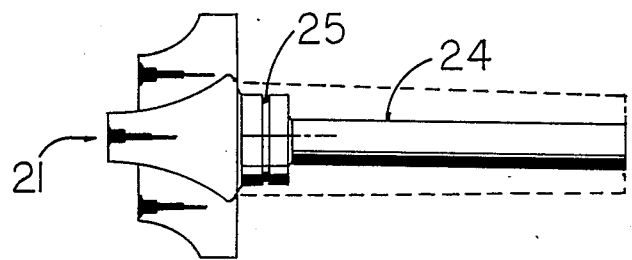

United States Patent [19]

Sterzel et al.

[11] Patent Number: 4,908,172
[45] Date of Patent: Mar. 13, 1990

[54] PRODUCTION OF CERAMIC MOLDINGS

[75] Inventors: Hans-Josef Sterzel, Dannstadt-Schauernheim; Gunther Mair, Mannheim, both of Fed. Rep. of Germany

[73] Assignee: BASF Aktiengesellschaft, Ludwigshafen, Fed. Rep. of Germany

[21] Appl. No.: 220,176

[22] Filed: Jul. 18, 1988

[30] Foreign Application Priority Data

Jul. 29, 1987 [DE] Fed. Rep. of Germany ....... 3725138

[51] Int. Cl.$^4$ ............................................. C04B 38/06
[52] U.S. Cl. ...................................... 264/63; 264/86; 264/328.2
[58] Field of Search ......................... 264/63, 328.2, 86

[56] References Cited

U.S. PATENT DOCUMENTS 4,113,480  9/1978  Rivers ................................... 264/63
4,734,237  3/1988  Fanelli .............................. 264/328.2

FOREIGN PATENT DOCUMENTS 0125912  9/1987  European Pat. Off. .

Primary Examiner—James Derrington
Attorney, Agent, or Firm—Keil & Weinkauf

[57] ABSTRACT

Ceramic moldings, in particular those having geometrically complicated shapes, are produced by a process in which a ceramic powder is mixed with a molding additive and the mixture is injected into a mold. In order to improve the mechanical properties of the molding, a solution of a high molecular weight polymer in a solvent is used as the molding additive. The mixture is injected at a temperature below the boiling point of the solvent and under from 100 to 1,500 bar into a porous, gas-permeable mold which is at a temperature above the boiling point of the solvent, the injection pressure being maintained until gas no longer escapes from the molding material or the mold.

5 Claims, 2 Drawing Sheets

PRODUCTION OF CERAMIC MOLDINGS

The present invention relates to a process for the production of ceramic moldings, in which a ceramic powder is mixed with a molding additive, the mixture is injected into a mold which determines the final shape and dimensions of the molding, the molding additive is removed and the molding material is sintered.

The present invention starts from a known process described in EP-A-O No. 125 912, which has been used to date for the production of ceramic moldings by injection molding. In this process, a ceramic powder is mixed with a thermoplastic, wax or a lubricant, such as stearic acid or oleic acid, and the mixture is granulated. The granules are converted into a green compact by means of an injection molding machine. However, the granules to be plasticized act like a lubricting gel paste in the injection molding machine and, particularly in the melting zone where the material is not yet sufficiently plasticized, remove metal chips from the machine parts, which chips cannot be removed from the green compact. The metal particles lead to inhomogeneities in the sintered molding and adversely affect its mechanical properties.

Furthermore, the high shear rate in the injection nozzle and in the mold cores results in a high degree of orientation of the polymers required as fluxes, which may lead to mechanical stresses in the molding and hence to the formation of microcracks. Microcracks often remain after subsequent removal of the organic additives by baking and after sintering and also substantially reduce the reliability and strength of the sintered moldings. Another disadvantage is that the organic molding additives used have to be removed completely from the green compact by pyrolysis before the actual sintering process. Pyrolysis, also known as baking, must be carried out sufficiently slowly to prevent the pressure of the escaping gases from causing additional cracking and pore formation, i.e. the gases must be able to diffuse through the green compact without substantial pressure build-up. This requires pyrolysis times which are, for example, as long as several days in the case of wall thicknesses of only 2-4 mm and hence greatly reduce the cost-efficiency of the process.

It is an object of the present invention to provide a process for the production of ceramic moldings which is free of the above-described deficiencies and in particular ensures the production of geometrically complicated moldings with high productivity, i.e. molding additives should be capable of being removed particularly rapidly from the molding material.

We have found that this object is achieved when the molding additive used is a solution of a high molecular weight polymer in a solvent, about 50–80% by volume of the agglomerated ceramic powder being mixed with about 50–20% by volume of the solution and the mixture being injected at a temperature below the boiling point of the solvent and under from 100 to 1,500 bar into a porous, gas-permeable mold which is at a temperature above the boiling point of the solvent, and when the injection pressure is maintained until gas no longer escapes from the molding material or from the mold.

According to the invention, a ceramic powder is mixed with a molding additive, in particular a high molecular weight polymer, dissolved in a solvent. The volume ratio of ceramic powder to solution is from about 1:1 to 1:4.

Suitable solvents for the high molecular weight polymers are water, alcohols, such as ethanol, n-propanol or isopropanol, and nonpolar solvents, such as aliphatic hydrocarbons.

Oxide ceramic powders, for example magnesium oxide, alumina, mullite, zirconium oxide or spinel, are most advantageously deagglomerated in water, so that water is advantageously used as a solvent for processing them. Accordingly, water-soluble polymers are used to increase the viscosity.

When dissolved in water, high molecular weight water-soluble polymers form highly viscous solutions having viscosities of from 100 to 10,000 dPa.s at concentrations as low as from 0.05 to 1% by weight. Hence, these aqueous solutions possess, at room temperature, viscosities which correspond to the viscosities at 150°–300° C. of the polymers usually used as fluxes. Because of the high viscosity, the suspension of the ceramic powder is stabilized, and separation does not occur even under high shear gradients. The hydrostatic forces which occurred during injection are transmitted to the individual powder particles.

Examples of suitable water-soluble polymers are polyvinylpyrrolidone, polyacrylic acid and its salts, polymethacrylic acid and its salts, polyvinyl alcohol, polyacrylamide and copolymers of monomers of the stated polymers. Other comonomers are dimethylaminoethyl acrylate methochloride and diethylaminoethyl acrylate sulfate.

The weight average molecular weight of the water-soluble polymers is from 1 to 10 million g/mole. Such polymers and copolymers are commercially available and are used as thickeners, as fluxes for reducing the resistance to flow and as precipitation assistants.

Nonionic polyacrylamides which contain small amounts of polyacrylic acid are preferably used as nonanionic polymers having molecular weights of from 3 to 10 million g/mole. Anionic water-soluble polymers are copolymers of acrylamide with 20–70% by weight of ammonium acrylate, having molecular weights of from 5 to 10 million g/mole. Since alkali metal cations have an adverse effect on particle boundary growth during sintering of the ceramic powder, ammonium ions are preferred as counter-ions.

Cationic water-soluble polymers are polyacrylamides which contain from 30 to 80% by weight of dimethylaminoethyl acrylate methochloride or diethylaminoethyl acrylate sulfate and have molecular weights of from 3 to 5 million g/mole.

Water-soluble high molecular weight natural polymers and their derivatives, such as alginates, methyl-/ethyl- or carboxymethylcellulose, starch or ligninsulfonates, can also be used.

Water-soluble polymers which can particularly preferably used are those which are slightly crosslinked with 50 to 1,000 ppm of polyfunctional crosslinking agents, such as diacrylyl or dimethylacyl compounds. Such polymers consist mainly of ammonium acrylate and acrylamide. They are usually used as printing ink thickeners for textile printing. Compared with the completely uncrosslinked water-soluble polymers, they have the advantage that higher viscosities can be obtained at low concentrations, for example about 10,000 dPa.s at a shear gradient of 0 and at room temperature with a 0.2% strength aqueous solution. In addition, they have very little tendency to flocculate the ceramic powders.

The concentrations to be used depend on the desired viscosity and on the molecular weight; however, they should not exceed 0.2% by weight, based on the ceramic material. Before the preparation of the mixture, the type of surface charge on the ceramic powder must be determined. It is essential to avoid a situation where the charges on the polymer have the opposite sign to the surface charge on the ceramic powder. In this case, undesired coagulation of the powder would occur. It is for this reason that the use of the slightly crosslinked water-soluble polymers with their low tendency to coagulation is particularly preferred.

In the procedure, very little polymer is used. If the polymer concentration in the shaped green compact is less than 0.2% by weight, the organic material volatilizes during heating in the sintering process.

The material required for production of the ceramic moldings by injection molding is prepared by deagglomerating the ceramic powder by milling in fully demineralised water, with or without the addition of small amounts of a surfactant. The final amount of water, i.e. from 20 to 50% by volume, is used from the outset. Thereafter, the suspension is transferred to a kneader and the water-soluble polymer is added. Kneading is carried out until the polymer has completely dissolved and the viscosity is constant, which is recognizable from the power consumption of the kneader.

For processing non-oxide ceramic powders of silicon nitride, silicon carbide, sialones and other non-oxide materials, dispersing in water is in principle also suitable. However, we have found that non-oxide powders can be more readily deagglomerated in nonaqueous solvents. Furthermore, the long residence time in water in the case of hydrolyzable materials, such as silicon nitride, may lead to the formation of undesirable oxide layers at the powder surface or increase the existing oxygen content in an uncontrollable manner.

A nonaqueous solvent/polymer system is suitable for such ceramic powders. Thus, the abovementioned water-soluble polymers are also soluble in alcohols, provided that no more than 5 mol % of the polymers are present as salts (ammonium polycarboxylates or polyammonium salts).

If nonpolar organic solvents are to be used, the high molecular weight polymers to be employed should be matched in their solubility with the said solvents. For example, high molecular weight polystyrene is soluble in aromatic hydrocarbons, such as toluene or xylene.

However, the aliphatic hydrocarbons, such as hexane, heptane or, in general, petroleum ethers and gasoline fractions, are particularly preferred dispersants for non-oxide ceramic powders. For increasing the viscosity, polyisobutylene having a molecular weight of 5 million g/mole or more is particularly suitable. In addition, polyisobutylene does not form a carbon residue during pyrolysis, so that the stoichiometric ratios in the subsequent sintering process are not adversely affected.

Since the novel process dispenses with plasticizing and the material is injected into the mold at room temperature, metal abrasion is substantially minimized.

The mold wall preferably consists of an open-pore sintered metal whose surface roughness is reduced to 0.5-2 $\mu$m by flame spraying or plasma spraying with a very finely divided metal powder, metal oxide powder, such as $Cr_2O_3$ or ceramic powder, such as boron nitride. In addition to low surface roughness, this results in good mold release properties, especially in the case of boron nitride. To permit good heat transfer, the sintered metal layer is kept very thin, i.e. about 1-10 mm. Adjacent to this is compact mold material which, for removal of the vapors, is provided with holes which lead to the sintered metal layer. The stream or the organic vapor is removed centrally from the mold, which is gas-tight to the outside, into a condensation apparatus. For rapid supply of the amount of heat required per injection cycle for evaporating the solvent, the mold is, for example, electrically heatable by means of heating elements.

The novel process permits the preparation of stable suspensions of nonagglomerated ceramic powders. Because evaporation of the solvent takes place under an opposing pressure which is far greater than its vapor pressure, neither pores nor cracks can form in the mold. The temperature of the mold wall is in general from 150° to 450° C., preferably from 200° to 400° C.

Because of the low residual content of organic material, which should be limited to 0.2% by weight, time-consuming pyrolysis is dispensed with. If mold temperatures above 300° C. are used, the polymers decompose directly, and the residual content of organic material falls well below 0.1%.

We claim:

1. A process for the production of a ceramic molding, the process comprising:
   (a) injecting a mixture containing a ceramic powder and a molding additive into a porous gas permeable mold that has an open-pore mold wall, wherein the molding additive is a solution of a high molecular weight polymer in a solvent, the ceramic powder is mixed at about 50-80% by volume with 50-20% by volume of the solution, the mixture is injected at a temperature below the boiling point of the solvent under a pressure of 100 to 1,500 bar, and the gas permeable mold is at a temperature above the boiling point of the solvent, so that some of the solvent is volatilized; and
   (b) sintering the remaining mixture, wherein the injection pressure is maintained until gas no longer escapes from the mixture or the mold.

2. The process of claim 1, wherein the polymer used is a high molecular weight water-soluble polymer and the solvent used is water.

3. The process of claim 1, wherein the polymer used is a high molecular weight water-soluble polymer having an ionic content of less than 5 mole % and the solvent used is an alcohol.

4. The process of claim 1, wherein the polymer used is high molecular weight polyisobutylene and the solvent used is an aliphatic hydrocarbon.

5. The process of claim 1, wherein the mixture is injected into the hot mold at about 150°-450° C.

* * * * *